Jan. 2, 1934. W. H. YOST 1,941,774
DUMP CAR
Filed Sept. 4, 1931 4 Sheets-Sheet 2

Inventor:
Winfield Hancock Yost

Jan. 2, 1934.  W. H. YOST  1,941,774
DUMP CAR
Filed Sept. 4, 1931  4 Sheets-Sheet 4
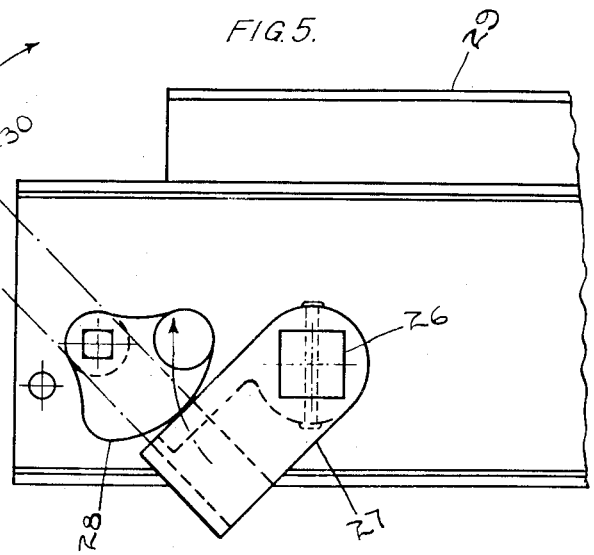
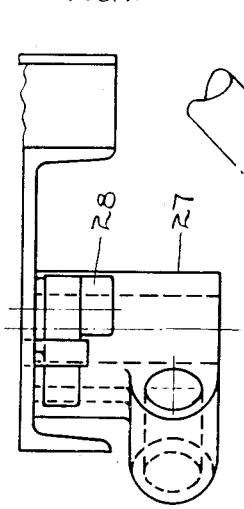
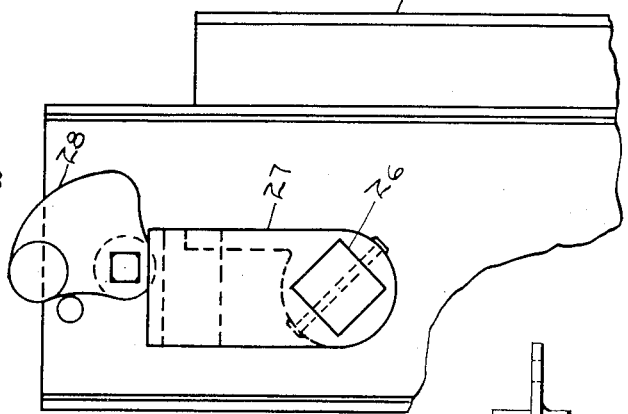
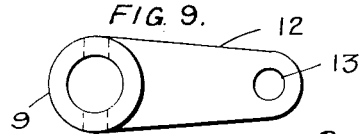
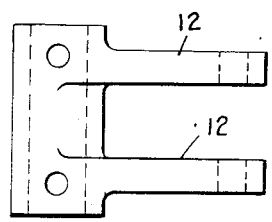
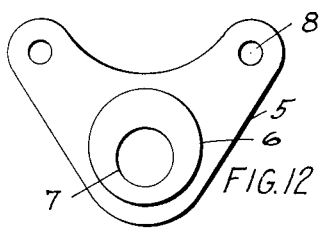
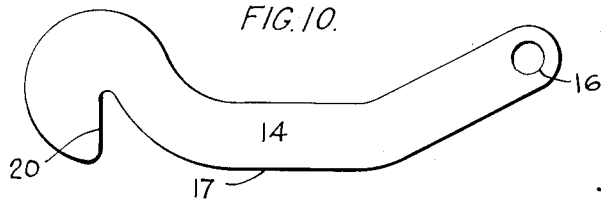
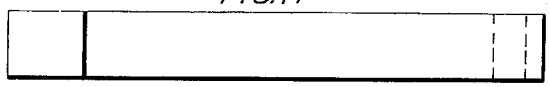
Inventor:
Winfield Hancock Yost Patented Jan. 2, 1934

1,941,774

UNITED STATES PATENT OFFICE 1,941,774

DUMP CAR

Winfield Hancock Yost, Montreal, Quebec, Canada

Application September 4, 1931. Serial No. 561,207

15 Claims. (Cl. 105—299)

This invention relates to improvements in dump cars, and more particularly the door mechanism of side dump cars used generally in ballast service, in which the contents of the car is discharged to one or both sides thereof.

An object of the invention is to provide a simple and efficient side door mechanism that can be quickly and safely operated from the platform of the car while same is standing or in motion, or may be operated from the ground while standing.

A further object of the invention is to provide in a car a side door mechanism which is positive in its action, will release the side doors permitting a full and unobstructed door opening, and will engage the side doors to lock them in closed position.

In a side dump car of the ballast type, the materials are usually loaded by some mechanical means (such as steam shovels etc.) and consequently all classes of material are loaded therein. Said cars are unloaded on trestles, into hoppers or on embankments, where no provision is made for the operator to stand, and therefore it is necessary to provide a side door operating mechanism that will be safe for manual operation under any and all unloading conditions. Heretofore, cars have been built with side door mechanisms that are operated safely from the ground, but they could not be safely operated from the platform of the car on trestles, etc. In my invention I provide a simple and efficient side door mechanism which can be safely operated by a man standing on the ground or on the platform of the car.

In the following I will describe the invention in detail of which:—

Figure 2 is a half longitudinal elevation.

Figure 3 is an enlarged section taken on line a. a. Fig. 1, showing side door in locked position.

Figure 4 is an enlarged section taken on line a. a. Fig. 1, showing side door in unlocked position.

Figure 5 is an enlarged end view of locking and operating mechanism for the door operating shaft in locked position.

Figure 6 is an enlarged end view of locking and operating mechanism for the door operating shaft in unlocked or open position.

Figure 7 is a side view of operating mechanism.

Figure 8 shows plan view crank portion of operating gear.

Figure 9 shows side elevation of crank portion of operating gear.

Figure 10 shows side elevation of hook portion of operating gear.

Figure 11 shows bottom view of hook portion of operating gear.

Figure 12 is a side view of the bearing in car underframe.

Figure 13 is an end elevation of the bearing in the car underframe.

Figure 1:
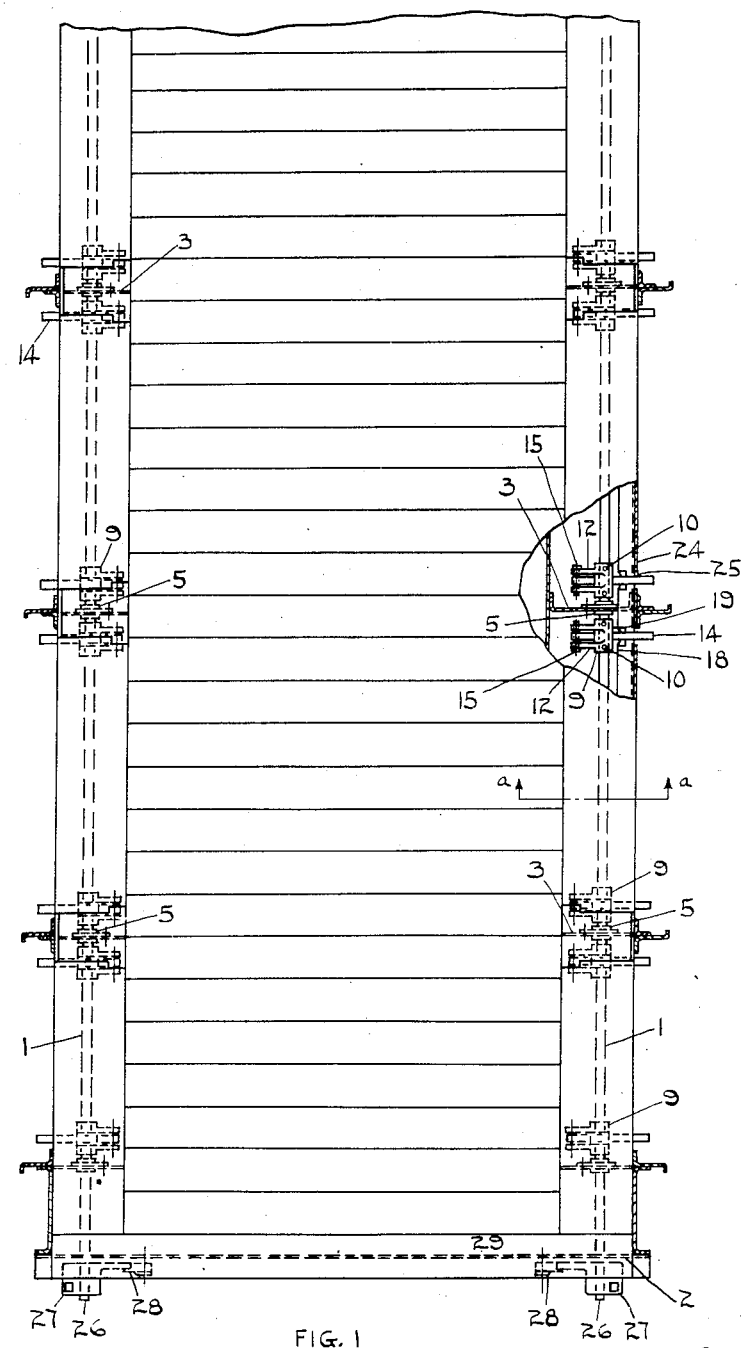
Figure 1 is a part plan view of a side dump car taken on line b. b.
Figure 2:
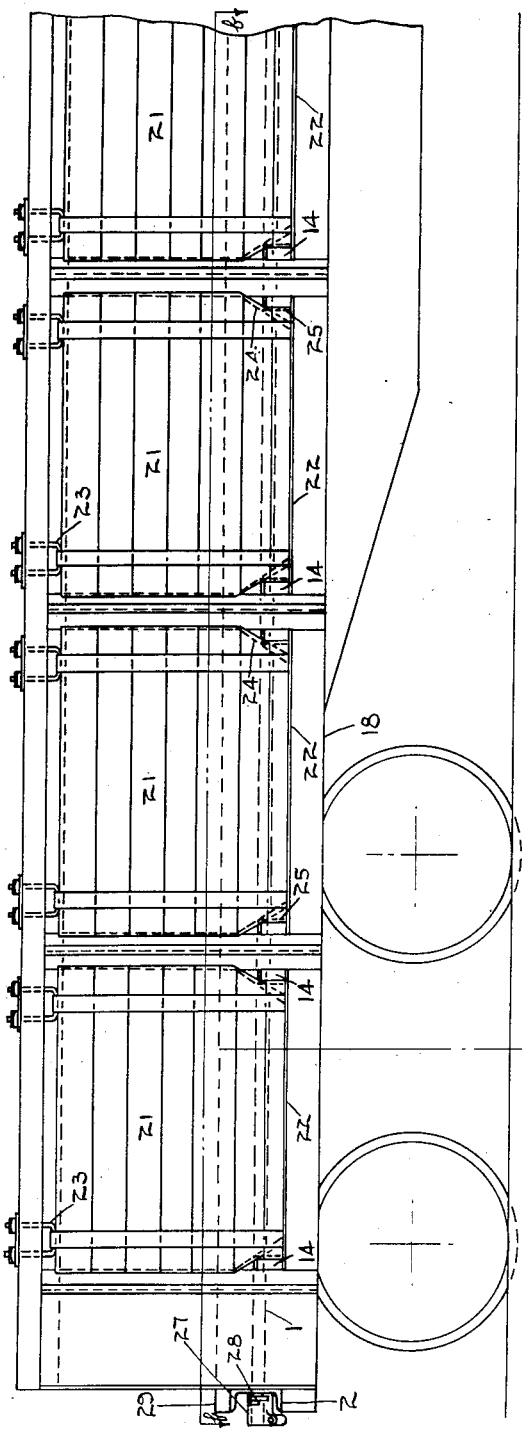
Fig. 2, but side doors omitted.

In the drawings and in the following description I have shown and described that which I have considered to be new, taken in connection with so much as is old, as will properly disclose the invention to others and enable those skilled in the art to practice the same, leaving out of consideration other and well known elements, which if set forth herein would only tend to confusion, prolixity and ambiguity.

Figure 4:
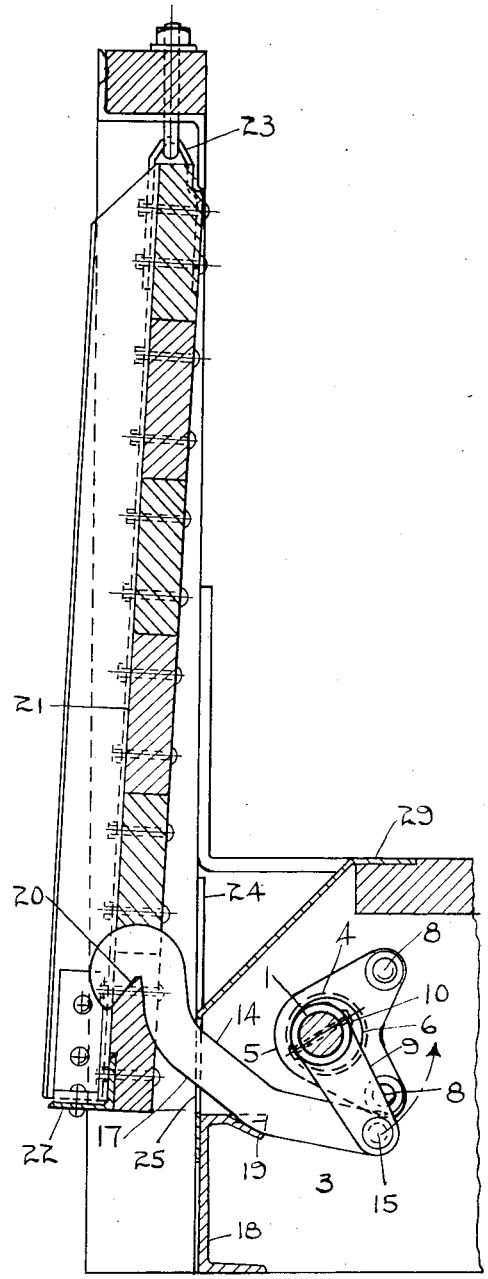

In applying my invention to swinging doors of side dump cars, I provide an operating shaft 1, extending from the face of the end sill 2 into the car below the floor level and through the transverse underframe parts 3. These underframe parts 3, are provided with opening 4 for the application of shaft bearing 5. Owing to the impossibility of punching all holes 4 in line in the underframe parts 3 and also to take care of erection variations in assembling cars I provide bearings 5, with boss 6, eccentrically located in relation to hole 7 in shaft bearing 5. In the application to the car underframe of shaft bearing 5, shaft 1 is lined up and then bearing 5 will be turned and fitted into opening 4 in the transverse underframe part 3 thus keeping shaft 1 in proper alignment. Shaft bearing 5 will then be securely connected to underframe part 3 by rivets or bolts 8. Cranks 9 are fixed on to shaft 1 by pins 10 through holes 11 in crank and shaft. Arms 12 are parallel and form a guide for hook 14. Hook 14 and crank 12 are pivoted together by pin 15 in bearings 13 of crank arm and 16 of hook 14. Hook 14 is irregular in shape in order that its movements may at all times be under control. Surface 17 of hook 14 will contact with the flange of side sill 18 which is offset at 19 to lift the outer end 20 of hook 14 during its outward movement when unlocking the side door 21 of car. Side door 21 is provided in this case with angle bar 22 which extends at each side of the door to engage with hook 14. The side door is hinged to the top plate of the car at 23 to give free movement to the side door and so said side door may be adjusted in height in order that the hook 14 will properly engage angle bar 22. Side floor sheet or gusset 24 is slotted at 25 for side hook 14 to pass therethrough. Side door 21 is hinged at 23 to cause said side door to hang when unlocked (as illustrated in Fig. 4) in a position to be engaged by hook 14 when shaft 1 is turned in the direction as indicated by arrow (Fig. 4). The end of shaft 1 outside of end sill 2 is squared as at 26 for the operating socket casting 27, and locked with cam lock 28.

The operation of this car is as follows:—

Figure 3:
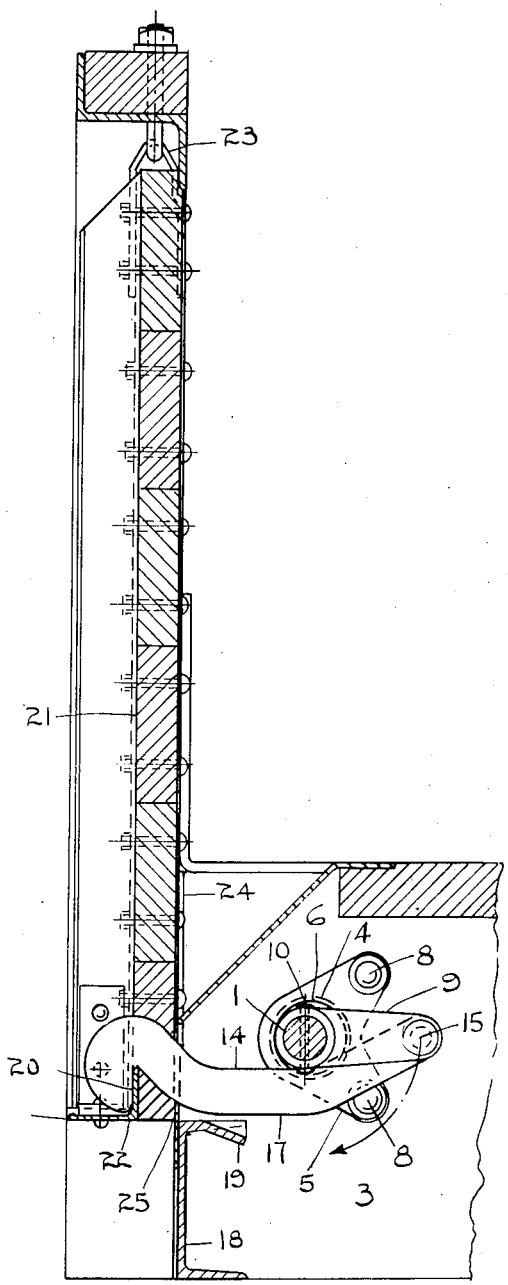

To operate the car from the platform, cam lock 28 is released, bar 30 is inserted in socket of operating casting 27 and moved in the direction of the arrow in Figure 5. By the inward movement of crow bar 30, shaft 1 will be turned in direction of arrow Fig. 3, crank 9 will turn in unison with shaft 1 and cause hook 14 to move outwardly with the side door 21. As the outward movement of hook 14 continues, the lower portion 17 will engage with surface 19 of side sill 18, such engagement upon further outward movement of hook 14 will cause the end 20 thereof to raise and to freely permit door 21 to open. When the pressure of the material in the car is removed the door 21 will fall by gravity to the position as shown in Fig. 4. When it is desired to close and lock the doors 21, the crow bar which is inserted in operating casting 27 is moved toward the outside of the car and will then turn shaft 1 in the opposite direction as shown by the arrow in Fig. 4. This movement will cause hook 14 to engage with angle bar 22 on door 21 and pull the door shut. To secure the operating shaft 1 from turning the cam 28 is provided.

To operate from the ground a bar is inserted from below and the motion is in the opposite direction from that described before.

It will readily be seen that crank 9 will have an oscillating motion and hook 14 will have a reciprocating motion during the cycle of operation.

Operating gears when placed on the outside of the car are continually being struck by the discharging materials and thereby become inoperative, I therefore apply my door operating mechanism in the car underframe below the floor level, and inside of the side sill in order that it may be protected from damage.

It will be obvious to those skilled in the art that my invention may be embodied in other cars than that herein shown. I do not wish to be confined, therefore to the specific construction herein shown and described, but contemplate all changes and modifications that come within the scope of the claims appended hereto.

What I claim is:—

1. In a dump car, comprising a side door, a horizontal floor, a side sill below said door, transverse members below said floor, an operating shaft passing through said transverse members, a crank mounted upon said shaft and a reciprocating member operatively connected to said crank for locking said door, said reciprocating member adapted to disengage from said door when in open position.

2. In a dump car, comprising a side door, a floor, a car underframe including a side longitudinal member below said side door and transverse members below said floor, a door operating mechanism journaled in said underframe inside of said side member and including a reciprocating member; said reciprocating member adapted to engage said door to close the latter.

3. In a dump car, comprising a door, a floor, an underframe including side and transverse members below said floor, a door operating mechanism journaled in said underframe inside of said side member and including a reciprocating member; said reciprocating member adapted to disengage from said door to open the latter.

4. In a dump car, door operating mechanism, a door, a floor, and a car underframe including a side longitudinal member below said door; said door operating mechanism comprising a shaft, an oscillating member and a reciprocating member, said members mounted below said floor and inside of said longitudinal side member, said reciprocating member adapted to engage said door to close the latter, and to disengage from said door when in open position.

5. In a dump car, door operating mechanism, a door, a floor, and a car underframe, including a side longitudinal member; said door operating mechanism comprising a shaft, an oscillating member and a reciprocating member, said members mounted below said floor and inside said side longitudinal member, said reciprocating member adapted to disengage from said door to open the latter.

6. In a dump car, door operating mechanism, a door, a floor, and a car underframe including a side longitudinal member below said door; said door operating mechanism comprising a shaft, an oscillating member and a reciprocating member, said members mounted below said floor and inside of the said side longitudinal member of the car, said reciprocating member adapted to engage said door upon movement of said oscillating member to close the door, and to disengage from said door when in open position.

7. In a dump car, comprising a side door, a substantially horizontal floor, a side longitudinal member below said side door, transverse members below said floor, of an operating shaft journaled to said transverse members, a crank mounted upon said shaft and a reciprocating member operatively connected to said crank, said reciprocating member being guided in its movement to lock said door, in closed position and to disengage from said door in open position.

8. In a dump car, comprising a floor, side longitudinal and transverse underframe members supporting said floor, a door, and a door operating mechanism comprising a bar operatively carried inside said side underframe members, a reciprocating member and a guide, said reciprocating member having a curved surface to engage said guide to control the movement of said reciprocating member.

9. In a dump car, comprising an underframe, a superstructure, a door hung from said superstructure, and a door operating mechanism; said door operating mechanism comprising a bar extending from the end of said underframe to a point within and operatively carried inside said underframe, a crank operatively connected to said shaft, a reciprocating member pivoted to said crank, and a guide; said reciprocating member having a transverse movement from said crank and a vertical movement from said guide to close and lock said door.

10. In a dump car, a side door hinged to the car frame above the floor and adapted to swing outwardly to permit the discharge of the contents of the car, side stakes at each side of the doors, supporting the car frame and connected to the underframe of the car, gusset plates parallel with the side of the car connecting the said stakes to the underframe, openings in said gusset plates and an operating mechanism for said door passing through said openings, said operating mechanism comprising an arm and a hook to reach out and draw said door to closed position.

11. In a dump car, the combination of an underframe, a side frame supported by said underframe, a door pivoted to said side frame and adapted to swing outwardly to permit the discharge of the contents of the car, of openings in said side frame adjacent said doors, and operating mechanism in said underframe comprising a shaft, an arm operatively connected to said shaft and a part operatively connected to said arm and extending outwardly through said openings to close and lock said doors.

12. In a dump car, the combination of an underframe including a side longitudinal member, a side frame supported by said underframe, a plurality of doors hinged to said side frame and adapted to swing outwardly to permit the discharge of the contents of the car, operating mechanism for said doors, openings adjacent the side frame and underframe to permit a transversely movable member of said operating mechanism to engage said doors to close and lock them in closed position.

13. In a dump car, the combination of an underframe including a side longitudinal member, a side frame supported by said underframe, a plurality of doors hinged to said side frame and adapted to swing outwardly to permit the discharge of the contents of the car, operating mechanism for said doors, openings adjacent the side frame and underframe to permit a transversely movable member of said operating mechanism to disengage from said doors to permit them to open.

14. In a dump car, an underframe, a floor supported on said underframe, a side frame carried by said underframe, side doors supported by said side frame and adapted to swing outwardly in discharging the contents from the car, operating mechanism for said doors, comprising a shaft mounted in the underframe inside of said side frame, a crank arm attached to said shaft and adapted to have a circular motion, a hook pivoted to said crank arm and adapted to have a transverse movement upon motion of said crank arm, a guide on said underframe for imparting a vertical motion to said hook during said transverse movement and means provided on said door to engage said hook in its inward motion to close and lock said door.

15. In a side dump car having a plurality of side doors hung from a side frame above a substantially horizontal floor, of an underframe supporting said floor and side frame, an operating shaft mounted beneath said floor and inside of the side frame and having a part operatively connected to said shaft and having reciprocating motion to reach out beyond said underframe to engage said doors to close and lock the latter.

WINFIELD HANCOCK YOST.